US010466817B2

(12) United States Patent
Dangy Caye

(10) Patent No.: US 10,466,817 B2
(45) Date of Patent: Nov. 5, 2019

(54) ELECTRONIC DEVICE WITH ROTATABLY MOUNTED BEZEL FOR INTERACTION AND METHOD OF OPERATING SUCH AN ELECTRONIC DEVICE

(71) Applicants: HUAWEI TECHNOLOGIES CO., LTD., Shenzhen (CN); Nicolas Dangy Caye, Munich (DE)

(72) Inventor: Nicolas Dangy Caye, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/740,338

(22) PCT Filed: Oct. 1, 2015

(86) PCT No.: PCT/EP2015/072757
§ 371 (c)(1),
(2) Date: Dec. 27, 2017

(87) PCT Pub. No.: WO2017/054881
PCT Pub. Date: Apr. 6, 2017

(65) Prior Publication Data
US 2018/0217682 A1    Aug. 2, 2018

(51) Int. Cl.
*G06F 3/0362* (2013.01)
*G04G 21/08* (2010.01)
(Continued)

(52) U.S. Cl.
CPC .......... *G06F 3/0362* (2013.01); *G04C 3/001* (2013.01); *G04G 21/08* (2013.01); *G06F 3/014* (2013.01);
(Continued)

(58) Field of Classification Search
CPC ........ G04C 3/001; G04G 21/08; G06F 3/014; G06F 3/016; G06F 3/0362; G06F 3/044;
(Continued)

(56) References Cited

U.S. PATENT DOCUMENTS

2002/0101457 A1*   8/2002   Lang ...................... G06F 1/163
                                                               715/856
2007/0247976 A1   10/2007   Capozzi et al.
(Continued)

FOREIGN PATENT DOCUMENTS

CN        102750122 A     10/2012
CN        204632261 U      9/2015
(Continued)

OTHER PUBLICATIONS

Brad Reed,"I can't believe I'm saying this but . . . webOS looks like a great smartwatch platform",BGR,Nest teardown, dated Mar. 5, 2015,total 4 pages.
(Continued)

*Primary Examiner* — Nelson M Rosario
(74) *Attorney, Agent, or Firm* — Kilpatrick Townsend & Stockton LLP

(57) ABSTRACT

The invention relates to an electronic device comprising a processor configured to implement a user interface for allowing a user to interact with the electronic device, a display and a touch panel in communication with the processor, wherein the display and the touch panel provide a touch-sensitive display configured to allow a user to interact with the electronic device using the user interface by touching the touch panel, and a bezel rotatably mounted on a housing of the electronic device wherein the bezel comprises a pointing element configured to activate the touch panel at a plurality of different locations of the touch panel and wherein the plurality of different locations of the touch panel
(Continued)

define a plurality of different positions of the bezel relative to the housing allowing the user to interact with the electronic device by using the bezel.

15 Claims, 7 Drawing Sheets

(51) Int. Cl.
*G06F 3/01* (2006.01)
*G06F 3/044* (2006.01)
*G06F 3/0488* (2013.01)
*G04C 3/00* (2006.01)
*G06F 3/041* (2006.01)
*G06F 3/045* (2006.01)

(52) U.S. Cl.
CPC .............. *G06F 3/016* (2013.01); *G06F 3/044* (2013.01); *G06F 3/0488* (2013.01); *G06F 3/04883* (2013.01); *G06F 3/045* (2013.01); *G06F 3/0414* (2013.01)

(58) Field of Classification Search
CPC .. G06F 3/0488; G06F 3/04883; G06F 3/0414; G06F 3/045
See application file for complete search history.

(56) References Cited

U.S. PATENT DOCUMENTS

| | | |
|---|---|---|
| 2013/0107674 A1 | 5/2013 | Gossweiler, III et al. |
| 2013/0127750 A1 | 5/2013 | Horiuchi et al. |
| 2014/0143737 A1* | 5/2014 | Mistry ................. G06F 3/0488 715/854 |
| 2014/0168132 A1 | 6/2014 | Graig et al. |
| 2014/0267039 A1 | 9/2014 | Curtis et al. |
| 2015/0109400 A1 | 4/2015 | Wang |
| 2015/0220178 A1 | 8/2015 | Zeliff et al. |
| 2015/0253891 A1 | 9/2015 | Westerman et al. |
| 2017/0003720 A1* | 1/2017 | Robinson ............... G06F 1/1692 |

FOREIGN PATENT DOCUMENTS

| | | |
|---|---|---|
| EP | 0216420 B1 | 12/1988 |
| EP | 0436468 B1 | 8/1994 |
| JP | H11327786 A | 11/1999 |
| JP | 2009217814 A | 9/2009 |
| JP | 2009534662 A | 9/2009 |
| JP | 2012103834 A | 5/2012 |
| JP | 2012195254 A | 10/2012 |
| JP | 2013109456 A | 6/2013 |
| JP | 2013186734 A | 9/2013 |
| KR | 101520806 B1 | 5/2015 |
| WO | 2014/189197 A1 | 11/2014 |

OTHER PUBLICATIONS

David Hodson,"Nest Learning Thermostat 2nd Generation Teardown",IFIXIT,LG urban watch,Apr. 23, 2013,total 11 pages.

* cited by examiner

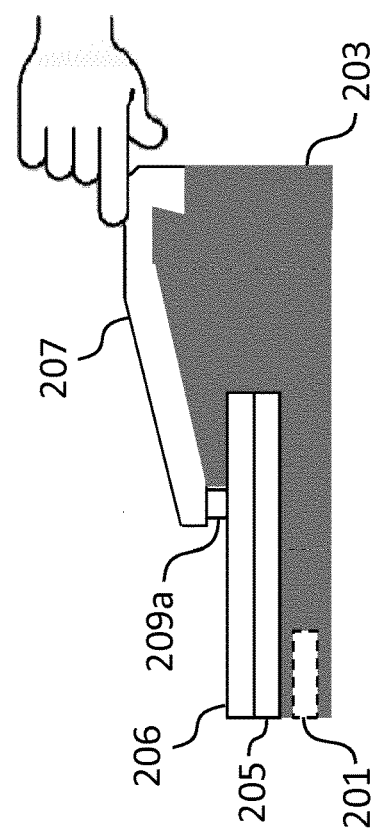
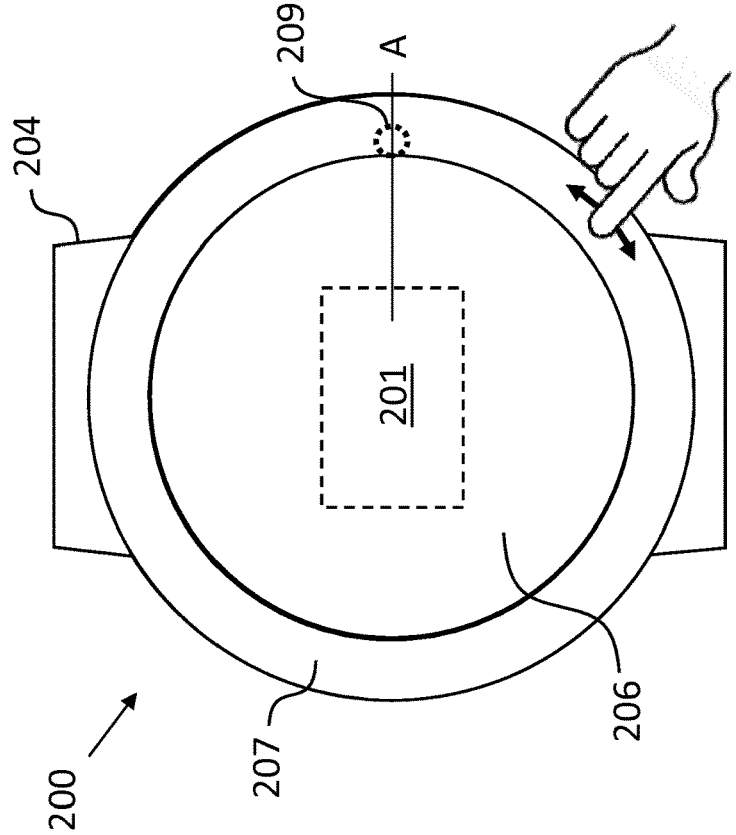

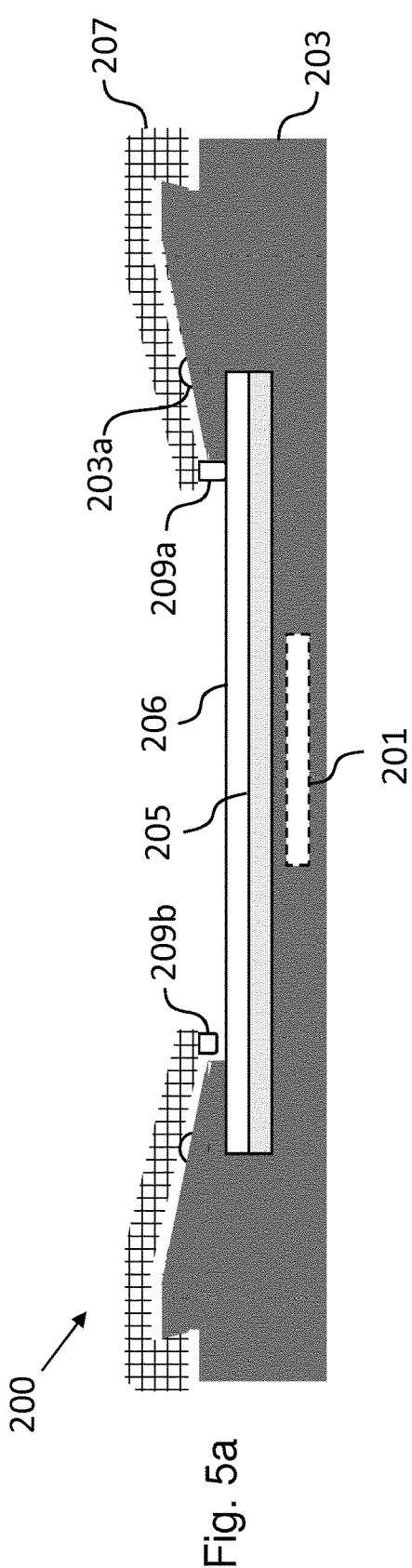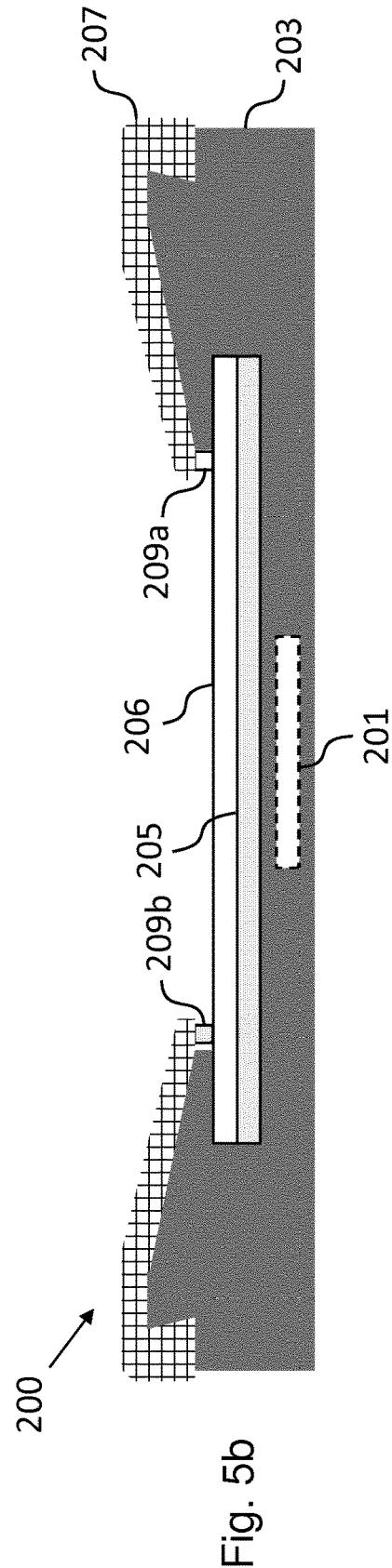

ELECTRONIC DEVICE WITH ROTATABLY MOUNTED BEZEL FOR INTERACTION AND METHOD OF OPERATING SUCH AN ELECTRONIC DEVICE

CROSS-REFERENCE TO RELATED APPLICATIONS

This application is a National Stage of International Application No. PCT/EP2015/072757, filed on Oct. 1, 2015, which is hereby incorporated by reference in its entirety.

TECHNICAL FIELD

The present invention relates to an electronic device and a method of operating such an electronic device. In particular, the present invention relates to a smartwatch and a method of operating such a smartwatch.

BACKGROUND

As smartwatches are becoming more and more popular, a lot of different smartwatch models have been developed within the last couple of years. While a lot of early smartwatch models were only able to perform some basic tasks in addition to timekeeping, such as calculations, translations, and simple game-playing, modern smartwatches are effectively wearable computers, which can run mobile apps and function, for instance, as portable media players. Some modern smartwatch models even feature a full mobile phone capability, i.e. are able to make or answer phone calls. In order to allow the user to access the rich functionality of a modern smartwatch, usually a modern smartwatch is provided with a sophisticated user interface. Often the user interface of a modern smartwatch is based on a touch display for displaying a graphical user interface and allowing a user to interact with the smartwatch by touching the touch display. Components of a user interface of an exemplary conventional smartwatch 100 are schematically shown in FIG. 1, comprising a display 105, a touch panel 106, a touch panel controller 106 and a processor 101 including a user interface engine 101a. A user can interact with the smartwatch 100 shown in FIG. 1, for instance, by touching the touch panel 106, by pressing a button 110, by means of a microphone 112 or by means of an acceleration sensor and/or gyroscope 114. The exemplary conventional smartwatch 100 shown in FIG. 1 further comprises a vibrator 116 and a RF interface 118.

WO 2014/189197 discloses a smartwatch having a user interface based on a rotatable bezel and a display. A graphical user interface is shown on the display and the user can interact with the smartwatch by rotating the bezel. It is not disclosed, however, how the rotation and/or position of the bezel is determined by the smartwatch. One possible solution for determining the rotation and/or position of a rotatable bezel of a smartwatch would be to provide an additional sensor to monitor the bezel's position. Such a solution, however, would make the smartwatch, for instance, more complex, more voluminous, more costly and less reliable. Moreover, adding a further sensor for monitoring the bezel's position might create some issues concerning dust- and/or waterproofness of the smartwatch.

Thus, there is a need for an electronic device comprising an improved user interface, more particular a smartwatch comprising an improved user interface.

SUMMARY

It is an object of the invention to provide an electronic device comprising an improved user interface, more particular a smartwatch comprising an improved user interface.

The foregoing and other objects are achieved by the subject matter of the independent claims. Further implementation forms are apparent from the dependent claims, the description and the figures.

According to a first aspect, an electronic device is provided comprising a processor configured to implement a user interface for allowing a user to interact with the electronic device, a display and a touch panel in communication with the processor, wherein the display and the touch panel provide a touch-sensitive display configured to allow a user to interact with the electronic device on the basis of the user interface by touching the touch panel, and a bezel rotatably mounted on a housing of the electronic device, wherein the bezel comprises a pointing element configured to activate the touch panel at a plurality of different locations of the touch panel and wherein the plurality of different locations of the touch panel define a plurality of different positions of the bezel relative to the housing allowing the user to interact with the electronic device by using, in particular rotating the bezel.

Thus, an electronic device is provided comprising an improved user interface in the form of a rotatable bezel and a pointing element interacting with the touch panel of the electronic device. The proposed solution allows the processor to easily determine the position of the rotatable bezel relative to the housing of the electronic device, while minimizing the space necessary within the housing of the electronic device for any further mechanical and/or electronic components and the costs therefor as well as improving the mechanical design of the electronic device with respect to dust- and waterproofness and an easy assembly.

In a first possible implementation form of the electronic device according to the first aspect, the touch panel is a capacitive touch panel.

By using a capacitive touch panel, it is, for instance, possible to implement the touch-sensitive display as a multi-touch sensitive display, i.e. a touch sensitive display that can simultaneously register interactions at several different locations.

In a second possible implementation form of the electronic device according to the first aspect as such or according to the first implementation form thereof, the pointing element is arranged between the touch panel and the bezel.

Arranging the pointing element between the touch panel and the bezel provides for a better protection of the pointing element from outside mechanical disturbances and an improved dust- and waterproofness. Moreover, the pointing element can be hidden from the user, thus providing for an improved user experience.

In a third possible implementation form of the electronic device according to the first aspect as such or according to any one of the preceding implementation forms thereof, the pointing element is in constant contact with the touch panel.

In such an implementation form of the electronic device according to the first aspect of the invention, it is possible to constantly determine the position of the bezel relative to the housing of the electronic device.

In a fourth possible implementation form of the electronic device according to the first aspect as such or according to the first or second implementation form thereof, the bezel is biased into a default state, wherein in the default state the pointing element is out of contact with the touch panel and wherein the bezel is configured to bring the pointing element into contact with the touch panel by pressing on the bezel in the default state thereby allowing the user to interact with the electronic device by pressing on the bezel in the default state.

The touch panel is exposed to less wear by providing for a default state with the pointing element being out of contact with the touch panel. Moreover, bringing the pointing element into contact with the touch panel by pressing or clicking on the bezel allows assigning a further function of the user interface to this action.

In a fifth possible implementation form of the electronic device according to the fourth implementation form of the electronic device according to the first aspect, the electronic device comprises an elastic element mounted between the bezel and the housing, wherein the elastic element is configured to bias the bezel into the default state and to generate a haptic feedback upon pressing on the bezel in the default state. In an implementation form, the elastic element could be, for instance, an elastic O-ring mounted on the top surface of the housing of the electronic device.

Providing an elastic element, in particular an elastic O-ring, between the housing and the bezel to bias the bezel into its default state, results in less wear and an improved user experience.

In a sixth possible implementation form of the electronic device according to the first aspect of the invention as such or according to any one of the preceding implementation forms thereof, the pointing element is made from a flexible material and/or an electrically conducting material.

A pointing element made from flexible material results in less wear of the touch panel. In case of an electrically conduction bezel, a pointing element made from electrically conducting material allows to determine whether the user is touching the bezel, thus enabling the assignment of different functions of the user interface depending on whether the user is in touch with the bezel or not.

In a seventh possible implementation form of the electronic device according to the first aspect of the invention as such or according to any one of the preceding implementation forms thereof, the bezel is made from an electrically conducting material comprising an electrically non-conducting coating located between the bezel and the touch panel, wherein the pointing element is defined by a recess within the electrically non-conducting coating or a material of higher electrical conductivity than the electrically non-conducting coating within the electrically non-conducting coating.

By implementing the pointing element as a recess within a coating on the bezel the pointing element can activate the touch panel without physically touching the touch panel, thus resulting in a minimal wear of the touch panel.

In an eighth possible implementation form of the electronic device according to the first aspect of the invention as such or according to any one of the preceding implementation forms thereof, the electronic device comprises at least two pointing elements.

Having at least two pointing elements at different locations of the bezel provides for an improved accuracy of determining the position of the bezel relative to the housing of the electronic device as well as a greater stability of the bezel, in case the at least two pointing elements have to be brought into contact with the touch panel by pressing or clicking on the bezel.

In a ninth possible implementation form of the electronic device according to the eight implementation form of the first aspect of the invention, in the default state of the bezel at least one pointing element of the at least two pointing elements is in constant contact with the touch panel and at least one other pointing element of the at least two pointing elements is out of contact with the touch panel.

Such an implementation form allows enhancing the user interface by assigning different functions to the rotation of the bezel in the default state, wherein at least one pointing element is in contact with the touch panel, and the rotation of the bezel in the "clicked" state, wherein all pointing elements are in contact with the touch panel.

In a tenth possible implementation form of the electronic device according to the first aspect of the invention as such or according to any one of the preceding implementation forms thereof, the processor is configured to operate the user interface in a first configuration, when the user touches the bezel, and in a second configuration, when the user does not touch the bezel.

Such an implementation form allows enhancing the user interface by assigning different functions to the case, when the user touches the bezel, and the case, when the user does not touch the bezel.

In an eleventh possible implementation form of the electronic device according to the first aspect of the invention as such or according to any one of the preceding implementation forms thereof, the bezel is made from an electrically conducting material.

This implementation form allows determining in a simple manner whether a user is touching the bezel or not.

In a twelfth possible implementation form of the electronic device according to the first aspect of the invention as such or according to any one of the preceding implementation forms thereof, the touch panel is a resistive touch panel.

In a thirteenth possible implementation form of the electronic device according to the first aspect of the invention as such or according to any one of the first to eleventh implementation forms thereof, the touch panel is a pressure sensitive touch panel.

This implementation form allows to get the force pressure applied by the user on the panel through the bezel ring.

In a fourteenth possible implementation form of the electronic device according to the first aspect of the invention as such or according to any one of the preceding implementation forms thereof, the electronic device is a wearable, in particular a smartwatch, or a control device.

According to a second aspect the invention relates to a method of operating an electronic device, wherein the method comprises the steps of implementing a user interface for allowing a user to interact with the electronic device, allowing the user to interact with the electronic device on the basis of the user interface by touching a touch panel of the electronic device, and rotating a bezel rotatably mounted on a housing of the electronic device relative to the housing, wherein the bezel comprises a pointing element configured to contact the touch panel at a plurality of different locations of the touch panel and wherein the plurality of different locations of the touch panel define a plurality of different positions of the bezel relative to the housing.

The method according to the second aspect of the invention can be performed by the electronic device according to the first aspect of the invention. Further features of the method according to the second aspect of the invention result directly from the functionality of the electronic device according to the first aspect of the invention and its different implementation forms described above.

BRIEF DESCRIPTION OF THE DRAWINGS

Further embodiments of the invention will be described with respect to the following figures, in which:

FIG. 2a shows a schematic top view of an electronic device in the form of a smartwatch according to an embodiment;

FIG. 2b shows a schematic cross-sectional view of an electronic device in the form of a smartwatch according to an embodiment;

FIG. 5a shows a schematic cross-sectional view of an electronic device in the form of a smartwatch according to an embodiment in a first state;

FIG. 5b shows a schematic cross-sectional view of an electronic device in the form of a smartwatch according to an embodiment in a second state;

Figure 1:
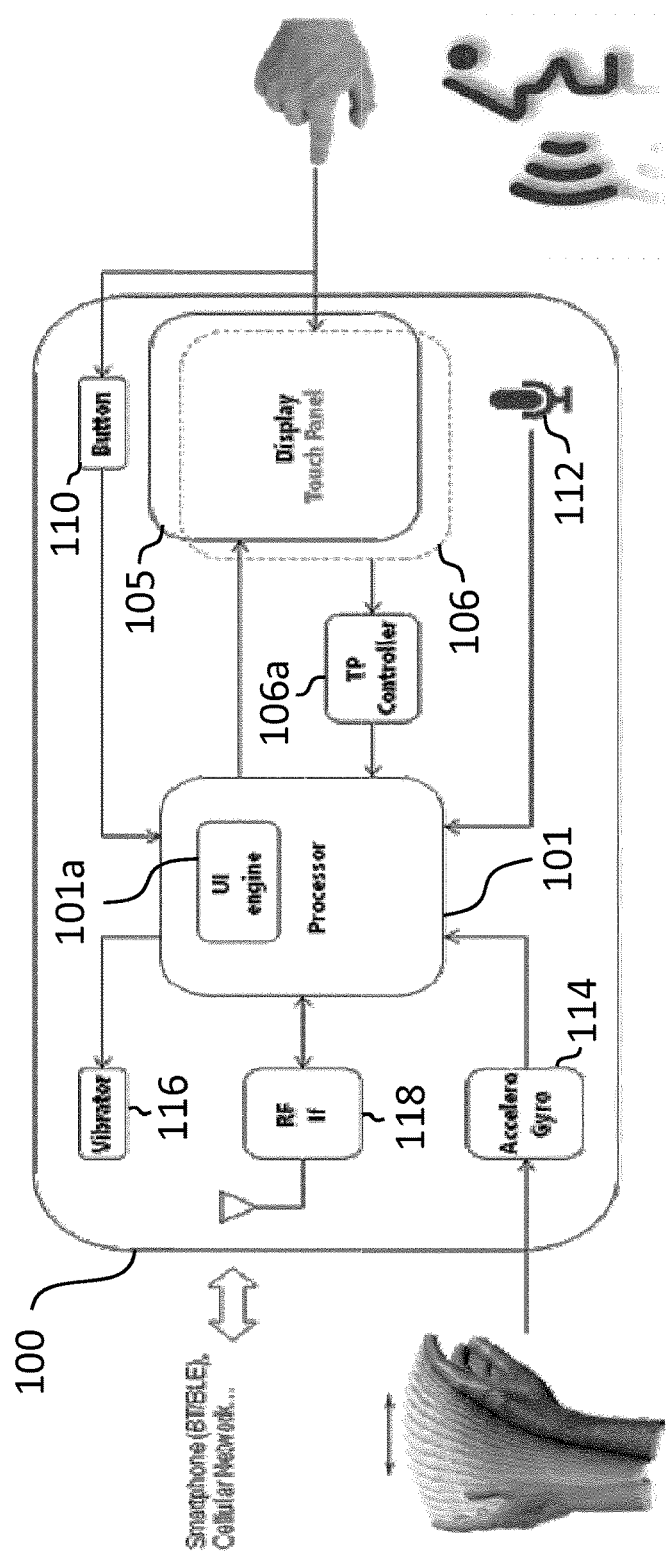
FIG. 1 shows a schematic block diagram of the components of a user interface of a smartwatch according to the prior art.

In the figures identical reference signs are used for identical or at least functionally equivalent features.

DETAILED DESCRIPTION OF EMBODIMENTS

In the following detailed description, reference is made to the accompanying drawings, which form a part of the disclosure, and in which are shown, by way of illustration, specific aspects in which the present invention may be practiced. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

FIGS. 2a and 2b show a top view and a cross-sectional view of an electronic device 200. In the figures and the following detailed description the electronic device 200 is implemented in the form of a smartwatch 200. A person skilled in the art, however, will readily appreciate that the present invention can be implemented in the form of other electronic devices as well, for instance, in the form of a smart home control device or other types of wearables.

The smartwatch 200 comprises a processor 201 configured to operate a user interface for allowing a user to interact with the smartwatch 200. In an embodiment, the processor 201 can be embedded within a housing or frame 203 of the smartwatch 200. As shown in FIG. 2a, in an embodiment the smartwatch 200 can comprise a wrist band 204 attached to the housing 203 for allowing a user to secure the smartwatch 200 around the users wrist.

The smartwatch 200 further comprises a display 205 and a touch panel 206 in communication with the processor 201. The display 205 and the touch panel 206 are implemented to provide a touch-sensitive display configured to allow a user to interact with the smartwatch 200 by touching the touch panel 206. In an embodiment, an operating system can be implemented on the processor 201 of the smartwatch 200 and can provide a graphical user interface on the display 205. In an embodiment, the touch panel 206 can be a capacitive touch panel. In an embodiment, the touch panel 206 can be a resistive touch panel.

The smartwatch 200 further comprises a bezel 207 rotatably mounted on the housing 203 or frame of the smartwatch 200. As shown in FIG. 2a, in an embodiment the bezel 207 can have an annular or ring-like shape and can be rotatable in a circumferential direction. In an embodiment, the bezel 207 can be rotatably mounted to the housing 203 by being clipped to the housing 203 of the smartwatch.

The bezel 207 comprises a pointing element 209a configured to activate the touch panel 206 at a plurality of different locations of the touch panel 206. In an embodiment, the pointing element 209a can be configured to act similar to a stylus in the form of a protrusion, e.g. in the form of a pin, on a surface of the bezel 207. In an embodiment, the pointing element 209a is made from a flexible material and/or an electrically conducting material. In an embodiment, the pointing element 209a can be implemented in the form of a recess within a coating on one of the surfaces of the bezel 207, as will described in more detail further below in the context of the embodiment shown in FIG. 6b.

Figure 3:
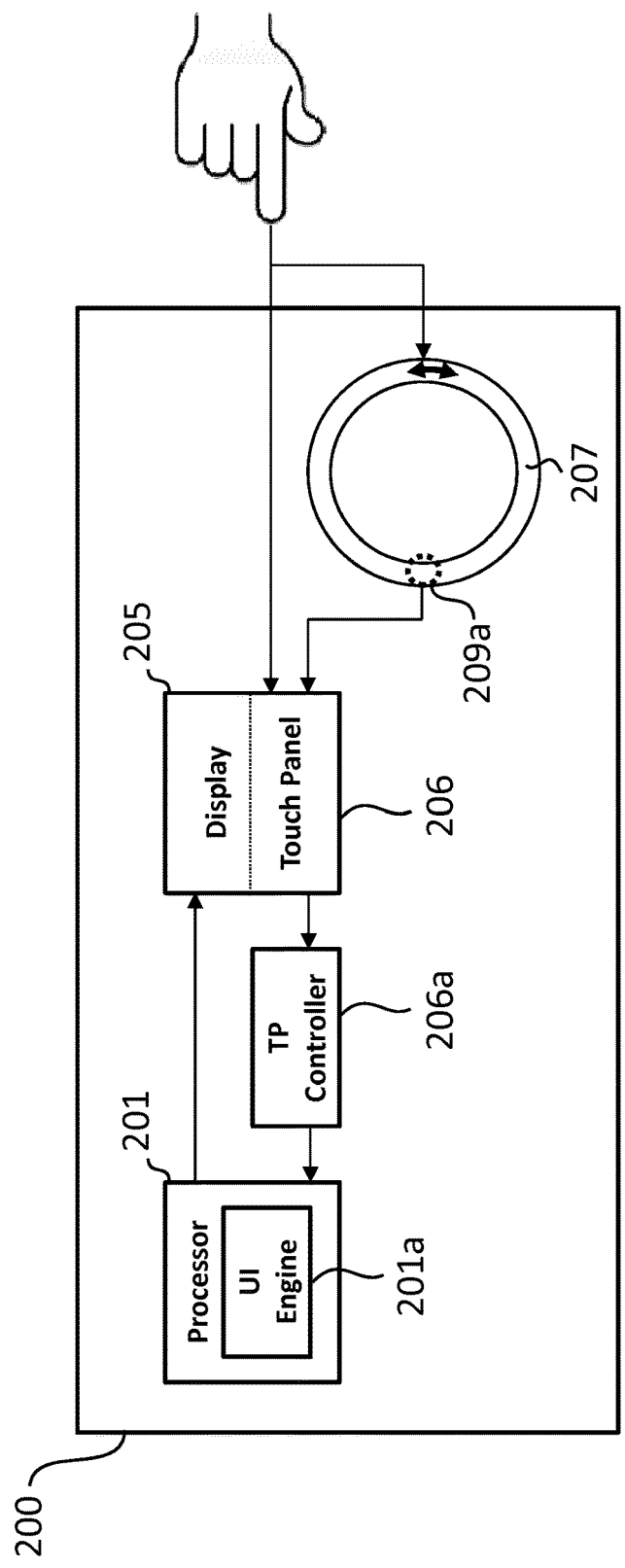
FIG. 3 shows a schematic block diagram of an electronic device in the form of a smartwatch according to an embodiment.

In FIG. 2a, the pointing element 209a is located by way of example approximately at a position of 3 o'clock of the smartwatch 200. The plurality of different locations, where the pointing element 209a can touch or activate the touch panel 206, define or correspond to a plurality of different positions of the bezel 207 relative to the housing 203. As a person skilled in the art will appreciate, in the embodiment shown in FIGS. 2a and 2b the plurality of different locations, where the pointing element 209a can touch or activate the touch panel 206, define a circle. Thus, by monitoring the locations, where the pointing element 209a touches or activates the touch panel 206, the processor 201 of the smartwatch 200 can track the corresponding positions of the bezel 207 relative to the housing 203. This, in turn, allows the user to interact with the smartwatch 200 by using the bezel 207, in particular by rotating the bezel 207 relative to the housing 203 of the smartwatch 200. To this end, in an embodiment the smartwatch 200 can further comprise a touch panel controller 206a in communication with the processor 201 and an user interface engine 201a implemented thereon, as shown in FIG. 3. In an embodiment, the touch panel controller can be also part of the processor 201. FIG. 3 shows schematically how a user can interact with a smartwatch 200 according to an embodiment, namely by rotating, pressing and/or touching the bezel 207 and/or by touching the touch panel 206.

In the exemplary embodiment shown in FIGS. 2a and 2b, the pointing element 209a is arranged between the touch panel 206 and the bezel 207. Arranging the pointing element 209a between the touch panel 206 and the bezel 207 provides for a better mechanical protection of the pointing element 209a from outside disturbances and an improved dust- and waterproofness of the smartwatch 200. Moreover, the pointing element 209a can be hidden from the users view, thus providing for an improved user experience.

In the exemplary embodiment shown in FIGS. 2a and 2b, the pointing element 209a is arranged to be in constant contact with the touch panel 206. Thus, in the exemplary embodiment shown in FIGS. 2a and 2b the processor 201 can constantly determine the position of the bezel 207 relative to the housing 203 of the smartwatch 200.

In an embodiment, the bezel 207 is made from an electrically conducting material, such as aluminum, steel or the like. When the conductive bezel 207 is touched by at least one finger of the user, the brought back capacity helps to activate the pointing element 209a and then triggers a touch event on the touch panel 206. In an embodiment, the processor 201 is configured to implement the user interface in a first configuration, when the user touches the electrically conducting bezel 207, and in a second configuration, when the user does not touch the electrically conducting bezel 207. In other words, in an embodiment the processor 201 is able to detect whether an interaction by the user with the smartwatch 200 is done by only touching the touch panel 206, by only touching and/or rotating the bezel 207 or by touching the touch panel 206 and by touching and/or rotating the bezel 207 and to implement the user interface accordingly. For example, the processor 201 could be configured to interpret a touch with a finger, for instance the index finger, on the touch panel 206 and a simultaneous use of the bezel 207 using a different finger, for instance the thumb and/or the middle finger, as a click or validation within the context of the user interface implemented by the processor 201.

Figure 4:
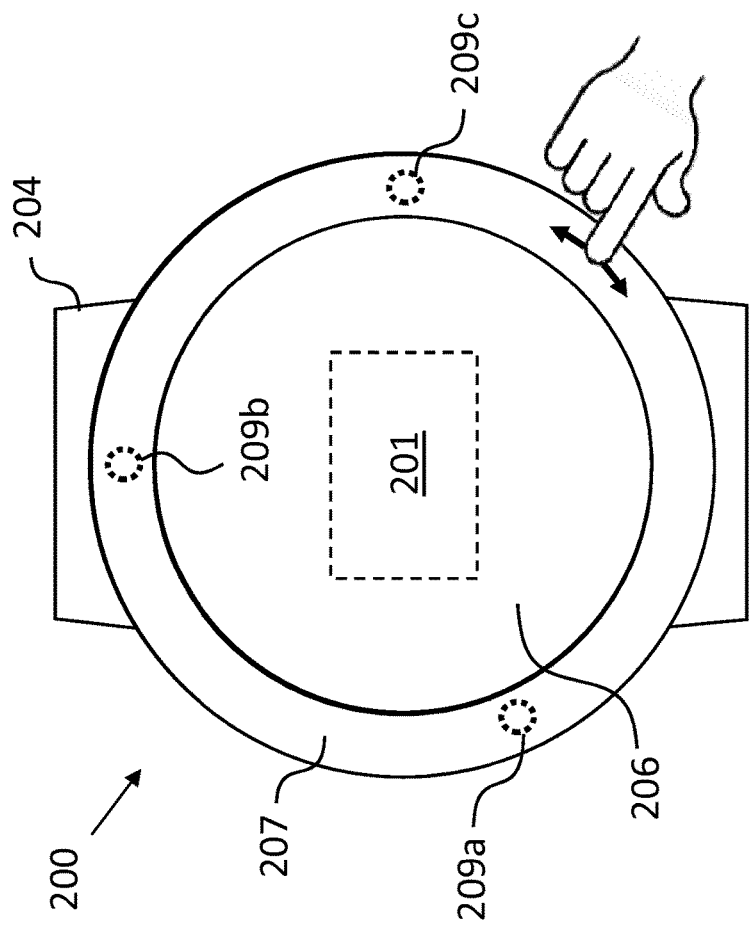
FIG. 4 shows a schematic top view of an electronic device in the form of a smartwatch according to an embodiment.

FIG. 4 shows a schematic top view of an electronic device in the form of a smartwatch 200 according to a further embodiment. The embodiment shown in FIG. 4 differs from the embodiment shown in FIGS. 2a and 2b in that in the embodiment shown in FIG. 4 the smartwatch 200 comprises three pointing elements 209a-c, whereas in the embodiment shown in FIGS. 2a and 2b the smartwatch 200 comprises a single pointing element 209a. In the exemplary embodiment shown in FIG. 4 the three pointing elements 209a-c are asymmetrically distributed along the ring shaped bezel 207, namely at respective positions of 12 o'clock, 3 o'clock and 8 o'clock. Such a distributed arrangement of the pointing elements 209a-c along the annular bezel 207 allows for an improved absolute determination of the position of the bezel 207 and provides for a more pleasing user experience, when using the bezel 207.

FIGS. 5a and 5b show a schematic cross-sectional view of an electronic device in the form of a smartwatch 200 according to a further embodiment in a first state and in a second state of the smartwatch 200, respectively. As in the case of the embodiments shown in FIGS. 2a, 2b and 4, the smartwatch 200 shown in FIGS. 5a and 5b comprises a processor 201, a housing 203, a display 205, a touch panel 206 and a bezel 207. For the sake of clarity the bezel 207 is shown in FIGS. 5a and 5b using a square shaped pattern. Further to the first pointing element 209a the smartwatch 200 shown in FIGS. 5a and 5b comprises a second pointing element 209b.

FIG. 5a shows the smartwatch 200 or bezel 207 in a first state, wherein the bezel 207 is spaced from the upper surface of the housing 203 by an elastic element 203a. In an embodiment, the elastic element 203a can be configured to bias the bezel 207 into the first state by pressing the bezel 207 into the first state so that the first state corresponds to the default state of the bezel 207. In an embodiment, the elastic element 203a is configured to provide a haptic feedback, i.e. the feeling of a "click", upon pushing or pressing on the bezel 207 in the first state. In an embodiment, the elastic element 203a can be an O-ring. In the first state shown in FIG. 5a the first pointing element 209a is in contact with, i.e. touches, the touch panel 206, whereas the second pointing element 209b is not in contact with the touch panel 206. Because in the first state shown in FIG. 5a the first pointing element 209a is in contact with the touch panel 206, the processor 201 can determine the position of the bezel 207 relative to the housing 203 of the smartwatch 200 on the basis of the position of the first pointing element 209a on the touch panel 206.

FIG. 5b shows the smartwatch 200 or bezel 207 in a second state, wherein the bezel 207 is pressed onto the housing 203, thereby compressing the elastic element 203a and the first pointing element 209a, which in an embodiment can be made from an elastic material, and bringing the second pointing element 209b into contact with the touch panel 206. Because in the second state shown in FIG. 5b the first pointing element 209a and the second pointing element 209b are in contact with the touch panel 206, the processor 201 can determine the position of the bezel 207 relative to the housing 203 of the smartwatch 200 on the basis of the position of the first pointing element 209a and/or the position of the second pointing element 209b on the touch panel 206.

As the processor 201 can determine the position of the bezel 207 relative to the housing 203 of the smartwatch 200 both in the first state shown in FIG. 5a and the second state shown in FIG. 5b, in an embodiment the processor 201 is configured to implement the user interface in a first configuration, when the bezel 207 is in the first state shown in FIG. 5a, and in a second different configuration, when the bezel 207 is in the second state in FIG. 5b. In other words, in an embodiment the processor 201 can be configured such that a rotation of the bezel 207 in the first state shown in FIG. 5a triggers a different action(s) than the same rotation of the bezel 207 in the second state shown in FIG. 5b.

According to a variant of the embodiment shown in FIGS. 5a and 5b it is conceivable that the smartwatch 200 does not comprise the first pointing element 209a in constant contact with the touch panel 206, but merely one or more pointing elements like the second pointing element 209b, which have to be brought into contact with the touch panel 206 by pressing on the bezel 207.

Figure 6A:
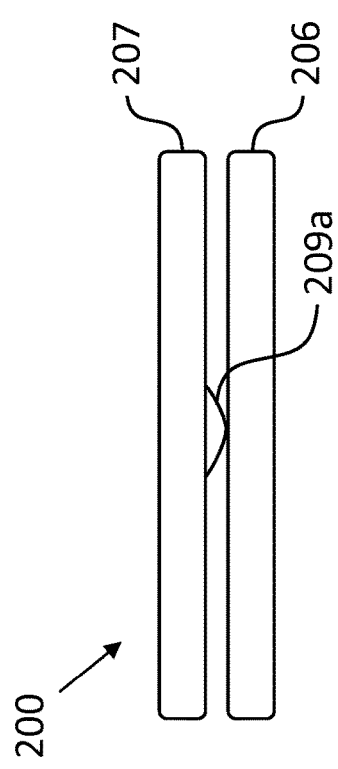
FIG. 6a shows a schematic cross-sectional view of a portion of an electronic device in the form of a smartwatch according to an embodiment.
Figure 6B:
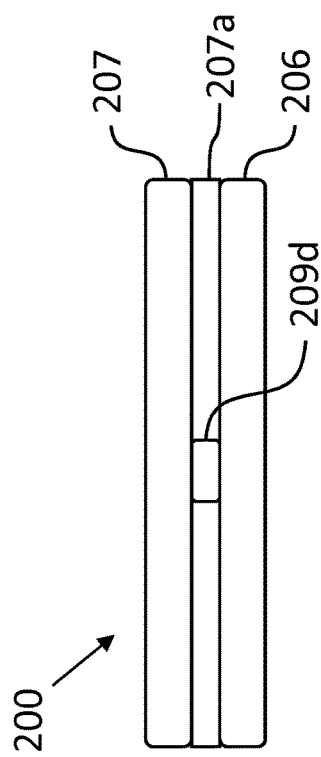
FIG. 6b shows a schematic cross-sectional view of a portion of an electronic device in the form of a smartwatch according to an embodiment.

FIGS. 6a and 6b show schematic cross-sectional views of a portion of a smartwatch 200 according to different embodiments.

In the embodiment of FIG. 6a the pointing element 209a is defined by a protrusion on the lower surface of the bezel 207, wherein the tip of the protrusion is in contact with the touch panel 206.

In the embodiment of FIG. 6b the pointing element 209d is defined by a recess 209d within a thin electrically non-conducting coating 207a of the bezel 207 made from an electrically conducting material, wherein the electrically non-conducting coating 207a of the bezel 207 is located between the bezel 207 and the touch panel 206. As the person skilled in the art will appreciate, the electrically non-conducting coating 207a shields the touch panel 206 from the electrically conducting material of the bezel 207 except in the region of the recess defining the pointing element 209d.

In a further embodiment, the pointing element 209d can be defined by a piece of material located within the electrically non-conducting coating 207a of the bezel 207, wherein the piece of material has a higher electrical conductivity than the electrically non-conducting coating 207a of the bezel 207.

In a further embodiment, the pointing element of the smartwatch 200 could be defined by both a protrusion on a surface of the bezel 207 and an electrically non-conducting coating in the vicinity of the protrusion.

Figure 7:
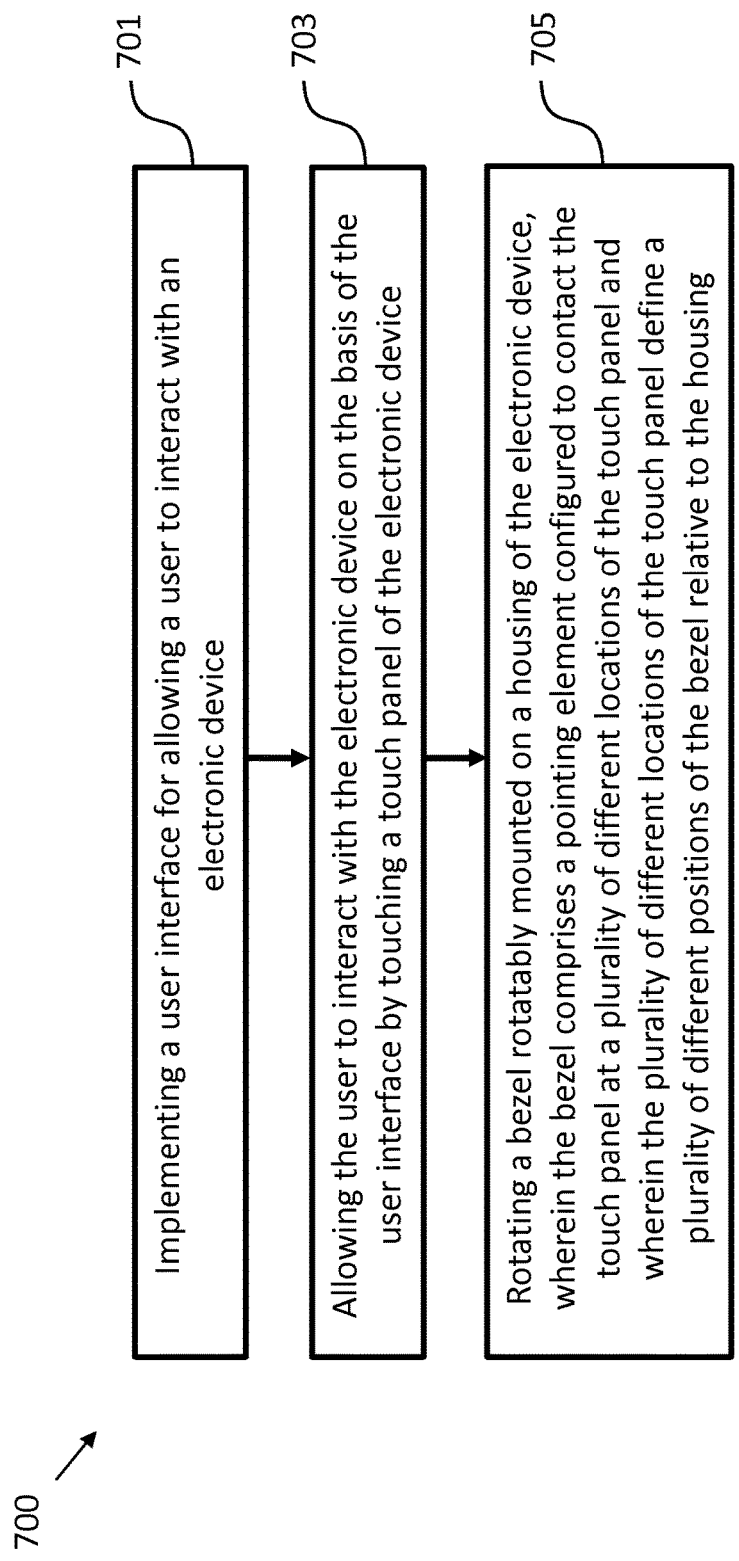
FIG. 7 shows a schematic diagram illustrating steps of a method of operating an electronic device according to an embodiment.

FIG. 7 shows a schematic diagram of a method 700 of operating an electronic device, such as the smartwatch 200 described above, according to an embodiment. The method 700 comprises the following steps.

In a step 701 a user interface is implemented for allowing a user to interact with the smartwatch 200. In a step 703 the user is allowed to interact with the smartwatch 200 on the basis of the user interface by touching a touch panel 206 of the smartwatch 200. In a step 705 a bezel 207 that is rotatably mounted on a housing 203 of the smartwatch 200 is rotated relative to the housing 203, wherein the bezel 207 comprises a pointing element, such as the pointing elements 209a-d shown in the embodiments of the previous figures, configured to contact the touch panel 206 at a plurality of different locations of the touch panel 206 and wherein the plurality of different locations of the touch panel 206 define a plurality of different positions of the bezel 207 relative to the housing 203 of the smartwatch 200.

Embodiments of the invention provide new means of interaction with an electronic device. As the interaction can be differentiated between a "classical" direct touch of the touch panel and one including the bezel, the user interface can be tweaked and optimized when the bezel is used. Using the bezel of an electronic device has the advantage that the view of the display is not obstructed by the users fingers. As an example, this allows to play games while controlling the electronic device with the rotatable bezel. The rotatable bezel provides advantageous technical effects for the navigation of and interaction with the electronic device, while leveraging the benefits of a simple analog user interface.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. An electronic device, comprising: a processor configured to implement a user interface for allowing a user to interact with the electronic device; a display and a touch panel in communication with the processor, wherein the display and the touch panel provide a touch-sensitive display configured to allow a user to interact with the electronic device using the user interface by touching the touch panel; and a bezel rotatably mounted on a housing of the electronic device, wherein the bezel comprises a pointing element configured to activate the touch panel at a plurality of different locations of the touch panel and wherein the plurality of different locations of the touch panel define a plurality of different positions of the bezel relative to the housing allowing the user to interact with the electronic device by using the bezel; and, wherein the bezel is biased into a default state, wherein in the default state the pointing element is out of contact with the touch panel and wherein the bezel is configured to bring the pointing element into contact with the touch panel by pressing on the bezel in the default state thereby allowing the user to interact with the electronic device by pressing on the bezel in the default state.

2. The electronic device of claim 1, wherein the touch panel is a capacitive touch panel.

3. The electronic device of claim 1, wherein the pointing element is arranged between the touch panel and the bezel.

4. The electronic device of claim 1, wherein the pointing element is in constant contact with the touch panel.

5. The electronic device of claim 1, wherein an elastic element is mounted between the bezel and the housing and wherein the elastic element is configured to bias the bezel into the default state and to generate a haptic feedback upon pressing on the bezel in the default state.

6. The electronic device of claim 1, wherein the pointing element is made from a flexible material and/or an electrically conducting material.

7. The electronic device of claim 1, wherein the bezel is made from an electrically conducting material comprising an electrically non-conducting coating located between the bezel and the touch panel and wherein the pointing element is defined by a recess within the electrically non-conducting coating or a material of higher electrical conductivity than the electrically non-conducting coating within the electrically non-conducting coating.

8. The electronic device of claim 1, wherein the electronic device comprises at least two pointing elements.

9. The electronic device of claim 8, wherein in a default state of the bezel at least one pointing element of the at least two pointing elements is in constant contact with the touch panel and at least one other pointing element of the at least two pointing elements is out of contact with the touch panel.

10. The electronic device of claim 1, wherein the processor is configured to implement the user interface in a first configuration, when the user touches the bezel, and in a second configuration, when the user does not touch the bezel.

11. The electronic device of claim 1, wherein the bezel is made from an electrically conducting material.

12. The electronic device of claim 1, wherein the touch panel is a resistive touch panel.

13. The electronic device of claim 1, wherein the touch panel is a pressure sensitive touch panel.

14. The electronic device of claim 1, wherein the electronic device is a wearable, in particular a smartwatch, or a control device, in particular a smart home control device.

15. A method of operating an electronic device, the method comprising the steps of: implementing a user interface for allowing a user to interact with the electronic device; allowing the user to interact with the electronic device using the user interface by touching a touch panel of the electronic device; and rotating a bezel rotatably mounted on a housing of the electronic device relative to the housing, wherein the bezel comprises a pointing element configured to contact the touch panel at a plurality of different locations of the touch panel and wherein the plurality of different locations of the touch panel define a plurality of different positions of the bezel relative to the housing; and, wherein the bezel is biased into a default state, wherein in the default state the pointing element is out of contact with the touch panel and wherein the bezel is configured to bring the pointing element into contact with the touch panel by pressing on the bezel in the default state thereby allowing the user to interact with the electronic device by pressing on the bezel in the default state.

* * * * *

UNITED STATES PATENT AND TRADEMARK OFFICE
CERTIFICATE OF CORRECTION

PATENT NO. : 10,466,817 B2  
APPLICATION NO. : 15/740338  
DATED : November 5, 2019  
INVENTOR(S) : Nicolas Dangy Caye Page 1 of 1

It is certified that error appears in the above-identified patent and that said Letters Patent is hereby corrected as shown below:

On the Title Page

Item (71), please delete the following information:
"Nicolas Dangy Caye, Munich (DE)"

Signed and Sealed this
Eleventh Day of February, 2020

Andrei Iancu
*Director of the United States Patent and Trademark Office*